May 8, 1962  H. S. HEMSTREET  3,033,174
HYDRAULIC SAFETY DEVICE FOR A FORCE SIMULATOR
Filed Dec. 16, 1957  3 Sheets-Sheet 1

HAROLD S. HEMSTREET
INVENTOR

BY Delbert P. Warner
ATTORNEY

HAROLD S. HEMSTREET
INVENTOR

BY Delbert P. Warner
ATTORNEY

May 8, 1962  H. S. HEMSTREET  3,033,174
HYDRAULIC SAFETY DEVICE FOR A FORCE SIMULATOR
Filed Dec. 16, 1957  3 Sheets-Sheet 3

HAROLD S. HEMSTREET
INVENTOR

BY Delbert P. Warner

ATTORNEY

United States Patent Office 3,033,174
Patented May 8, 1962

3,033,174
HYDRAULIC SAFETY DEVICE FOR A
FORCE SIMULATOR
Harold S. Hemstreet, Binghamton, N.Y., assignor to General Precision Inc., a corporation of Delaware
Filed Dec. 16, 1957, Ser. No. 702,968
15 Claims. (Cl. 121—47)

The present invention relates to hydraulic safety devices. More particularly, it relates to means associated with a hydraulic load simulaitng device which serves to prevent a sudden overload on part of the device when another part of the device undergoes a sudden failure.

Among the prior art devices are electrical controls attached to a servo valve with a relay to actuate the valve. The connection is such that the relay operates the valve in response to changes in current corresponding to certain changes in pressure which are indicative of hydraulic failure. Such devices have proven unsatisfactory since they respond only to very large changes in pressure and introduce an undesirable time delay. In these prior art devices the system generally is exposed to at least one violent shock before the safety device operates.

Another prior art device consists of simple mechanical stops which are intended to absorb the force. These stops are inadequate for many installations where space requirements are such that the mechanical stops cannot be placed in a way to adequately stop the undesired motion. An example of such limited space is to be found in the cockpit space of aircraft trainers.

It is a primary object, therefore, of this invention to provide a hydraulic safety device which will effectively prevent damage to the cockpit and the personnel of aviation trainers, and other devices employing such systems, which might otherwise result from the failure of a hydraulic load simulator.

It is another object of this invention to provide a hydraulic control device which will serve to prevent damage to a hydraulic system due to failure in a part of the system, whether the failure results in an increase or a decrease in pressure.

It is a further object of this invention to provide a simple, economical control device capable of acting quickly in response to changes in pressure before the pressure builds up to dangerous differences in level, thereby preventing a hydraulic circuit from being subjected to a too large change in pressure.

Additional objects and advantages will become apparent from the following description of a preferred embodiment of the invention in the light of the accompanying drawings and disclosure.

The devices illustrated and described in detail as follows provide an all hydraulic system which is responsive to information contained within the system to shut the system down whenever certain abnormal conditions prevail which indicate a failure of the device. The system is arranged in such a way that certain changes in pressure within the system are considered to be normal (i.e., cause the system to operate in the desired manner) when associated with a particular mode of behaviour of the fluid and the elements comprising the system; but, similar changes in pressure associated with other modes of behaviour of the elements and fluid are considered to be abnormal and, in fact, represent a condition of failure in the system. The arrangement of the system is such that when a failure condition occurs, connections are made within the system which cause it to operate to shut off the power elements and thus prevent damage.

This system is particularly adapted to trainer systems, such as that shown in the copending application of Harold S. Hemstreet et al. on a device for "Force Simulation," Serial No. 620,851 filed November 7, 1956.

Figure 1:
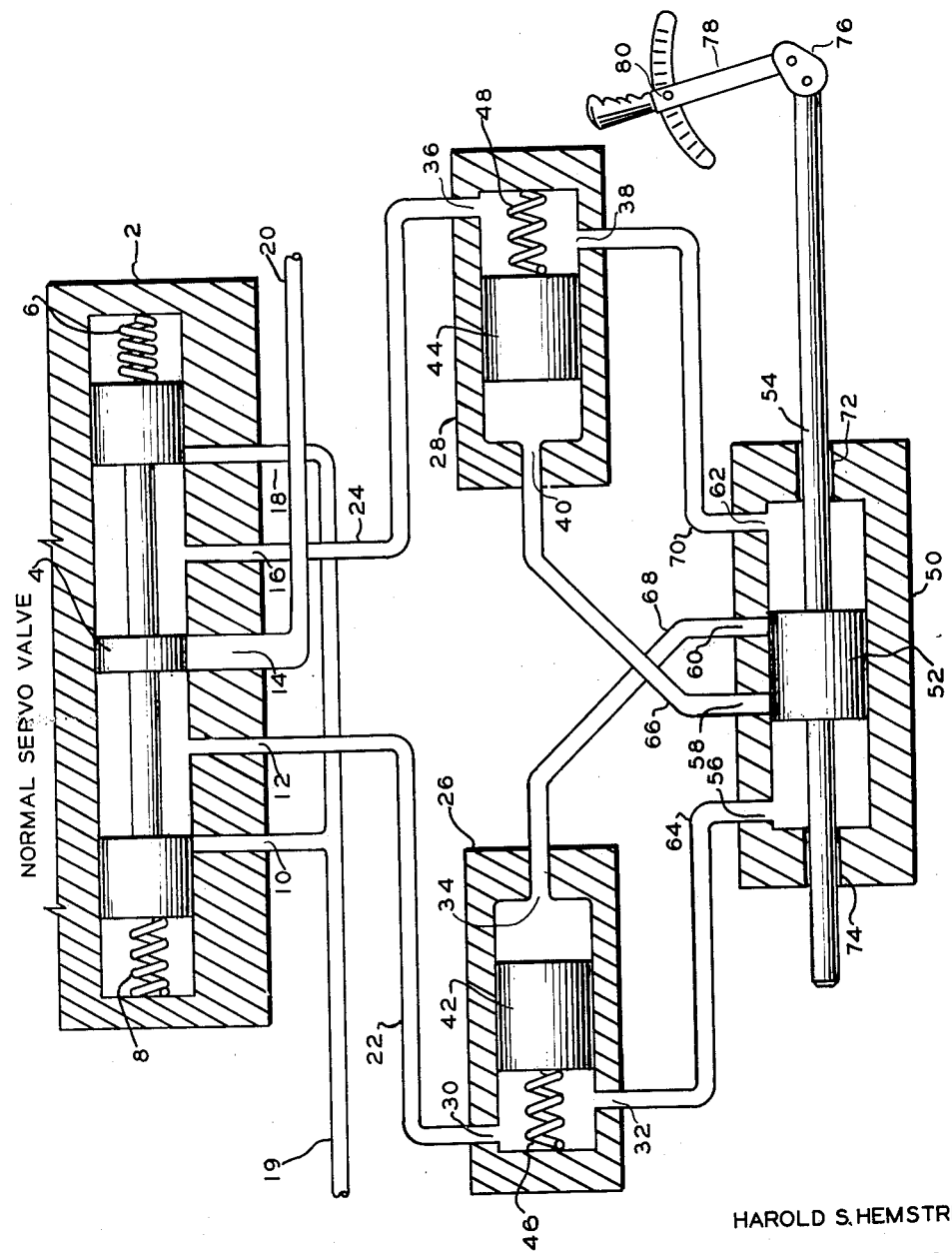
FIG. 1 is a partial section of an embodiment of the invention.

Turning first to FIG. 1, we find the normal servo valve 2 within which is placed a spool or piston 4 and two coil springs 6 and 8 which tend to keep the spool 4 in a fixed position within the servo valve. Ports are provided, which may be of the common annular type or may preferably be narrow slits in the walls of the normal servo valve 2, which are illustrated in the drawing at 10, 12, 14, 16 and 18 in the conventional manner for such ports.

A hydraulic drain line is provided at 19 which connects to ports 10 and 18 in the servo valve, and a pressure line is provided at 20 connected to port 14. Hydraulic lines at 22 and 24 connect respectively into ports 12 and 16 of the servo valve 2. Cylinders, which may be designated as safety cylinders are provided at 26 with ports at 30, 32 and 34 and also at 28 with ports at 36, 38 and 40. Each safety cylinder contains a safety piston or spool therein as indicated at 42 and 44. The pistons 42 and 44 are loaded or biased by springs 46 and 48 respectively.

At 50 in FIG. 1 is indicated a cylinder which may be called the operating cylinder, in association with the piston or spool 52 and the piston rod 54. In the cylinder 50 are located ports 56, 58, 60 and 62 connecting respectively to hydraulic lines 64, 66, 68 and 70. As shown, the hydraulic lines 64, 66, 68 and 70 terminate at their opposite ends in ports 32, 40, 34 and 38, respectively.

Through the walls of cylinder 50 are openings 72 and 74 which provide support for the piston rod 54 therethrough. Attached to 54 there is shown control means such as that shown schematically at 76, 78 and 80 representative of the control stick in a flight simulator.

The normal servo valve 2 is coupled, by means not shown, to flight simulating computers, or to other devices which will cause the spool 4 to move and produce a variation of pressure on the ends of the spool or piston 52. In flight simulators the purpose of this arrangement is to transmit the "feel" of an aircraft to the stick 78 so that a realistic impression of the way an actual aircraft will respond can be conveyed to the student pilot.

The hydraulic control loading unit which may include elements such as normal servo valve 2 and piston 52 necessarily must convey a large amount of power and be able to respond quickly in modern flight simulators, particularly those simulators designed to correspond to jet aircraft. This being so, it is possible for a unit such as normal servo valve 2 to transmit large amounts of power through the connecting hydraulic lines to a piston which will cause the stick 78 to move with great force and sometimes to fly about in a dangerous manner. Damage to equipment, or injury ot personnel, may result if there is a failure in the simulator system which causes the piston 4 to move rapidly and violently in one direction or the other. The cylinders at 26 and 28 are coupled into the hydraulic connecting lines 22 and 24, between servo valve 2 and cylinder 50 to shut off the power in the system in the event that such a failure occurs.

The operation of the device in FIG. 1 can best be understood in terms of a predetermined set of rules. The normal servo valve 2 is a loading device and not a position servo in the usual sense; therefore, in normal operation the force exerted by the hydraulic system always tends to drive the piston back toward its neutral position. We can establish a definite set of rules involving position of the piston and differential pressure across it and this set of rules can be used to distinguish between normal and abnormal operation. In FIG. 1, if hydraulic piston 52 is moved to the right by forces exerted by the pilot on the stick, then the pressure on the right hand side of the piston should be higher than the pressure on the left hand side. Conversely, if the pilot moves the stick so as to displace the piston to the left, the pressure on the left hand side of the piston should be higher than on the right hand side.

The two situations referred to might be called the normal conditions in the operation of this device. In the event of a sudden failure in the system so that the pressure suddenly rises on the right hand side of piston 52, the piston will be driven hard to the left. The distinction between this situation and the preceding two which should be noted, is that in the latter the pressure differential across the piston increases at the same time that the piston is displaced toward the low pressure side, while in the former the differential pressure across the piston increases as the piston is displaced toward the high pressure side. Expressed in different language, it may be said that a failure condition exists in this system whenever a differential pressure across piston 52 is accompanied by a positioning of the piston toward the low pressure side, and that a normal condition exists whenever a like differential pressure is accompanied by a positioning of the piston toward the high pressure side. The device shown in FIG. 1 recognizes these conditions and causes the system to be stopped whenever a failure occurs.

Tabulating these conditions the following significant situations occur:

Differential pressure on piston_____ } =normal.
Piston displaced toward high pressure side___

Differential pressure on piston_____ } =failure.
Piston displaced toward low pressure side____

The control or safety pistons 42 and 44 are retained, or biased by weak springs 46 and 48 in such a way that each piston is normally held in a position to keep the ports open but may be moved to a position such as to cut off flow from one end or the other of the cylinder 50. The opposite ends of these control or safety pistons are in contact with fluid in the cylinders 26 and 28 which connect by means of lines 66 and 68 to cylinder 50.

Let us now consider the action of safety piston 44. If the control stick is moved so as to displace the piston 52 to the right, then the pressure will be higher on the right hand side of the piston than on the left hand side. As the piston moves to the right, the port 58 connecting the cylinder 50 through line 66 with the cylinder 28 is uncovered. Since the pressure is higher on the right hand side of the piston 52 than on the left hand side, the differential pressure transmitted to piston 44 will also be higher on the right hand side than on the left hand side and the safety piston 44 will maintain the ports 36 and 38 open.

Assuming that a sudden failure occurs, causing the normal servo valve 2 to move in such a way that high pressure is transmitted from the pressure conduit 20 through the valve and the conduits 22 and 64 to the left hand side of piston 52, then the piston 52 will be forced to the right thereby uncovering the port 58, connected through conduit 66 to the port 40 on the left hand side of safety piston 44. Under these circumstances the pressure on the left hand side of safety piston 44 will be greater than that on the right hand side, and the piston will be moved to the right against the force of the spring 48 to close the port 38, to block off the flow of oil out of the right hand of the cylinder and effectively stop the whole system. When normal operation is again restored, the pressure on the safety piston will again drive it back to its normal position as shown in the figure. If the failure had been in the opposite sense, i.e., one in which the pressure abruptly rose on the right hand side of the main cylinder 52, then the left hand safety piston 42 would perform in an analogous fashion and stop the system.

This arrangement (FIG. 1) has the great advantage of being very simple, but is limited, since it cannot easily accommodate changes such as trim changes. The trim changes could be accounted for by building the piston 52 in the main cylinder 50 in the form of a helix so that it may be rotated about its axis and still cover, in its neutral position, the two ports going to the safety pistons when the ports are placed much further apart. Another alternative is to have an external control piston instead of the ports 58 and 60 which open directly into the main cylinder. This external control piston would have to be driven by the main cylinder rod itself, and being external could be adjusted to accommodate trim changes.

Figure 2:
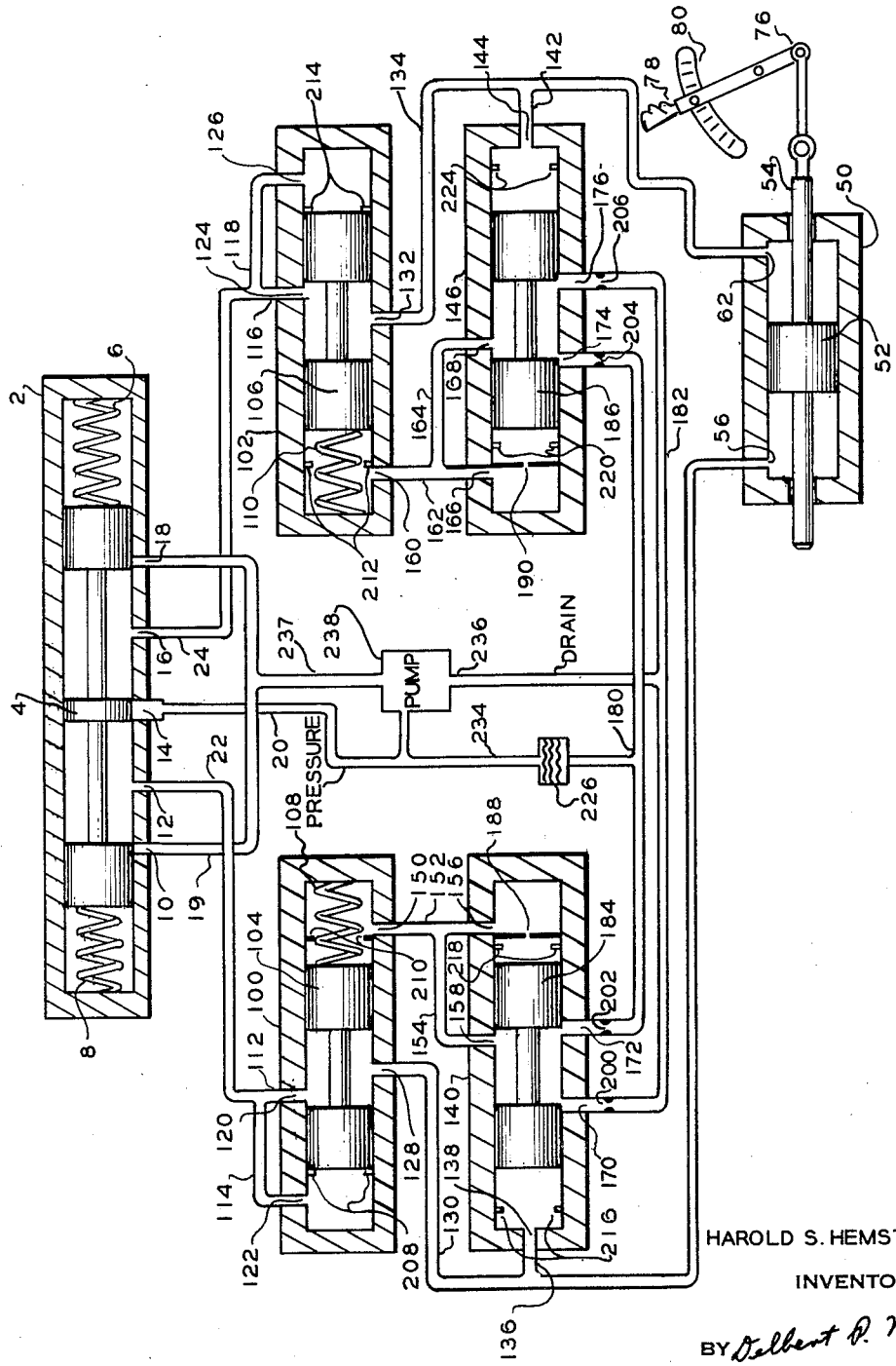
FIG. 2 is a partial section illustrating another embodiment of the invention.

FIG. 2 illustrates an embodiment of the invention which is more readily capable of taking trim changes into account. Corresponding parts of the two drawings are labeled the same. It may be noted that the embodiment illustrated in FIG. 1 operates as a result of a comparison made within the system between the pressure difference on the faces of the safety pistons and the position of the piston 52 whereas, the system shown in FIGURE 2 depends upon a comparison between the rate of change of this pressure difference and the rate of change of position.

In FIG. 2 the servo valve 2 is connected by means of ports 12 and 16 through hydraulic lines 22 and 24 to power shut-off cylinders 100 and 102 which in turn enclose power shut-off spools, pistons or other reciprocating means 104 and 106 connected by springs 108 and 110 to one end of the corresponding cylinder. Hydraulic lines 22 and 24 branch into two elements 112, 114 and 116, 118 respectively. Lines 112 and 114 connect through the ports 120 and 122 into cylinder 100 and lines 116 and 118 connect through ports 124 and 126 respectively into cylinder 102.

Port 128 in cylinder 100 connects via lines 130 and 136 to port 138 in cylinder 140. Line 130 also connects to cylinder 50 through port 56. Power shut-off cylinder 102 is connected from its port 132 through line 134 and line 142 to port 144 in cylinder 146, and through port 62 into cylinder 50. Cylinder 100 is connected to cylinder 140 through port 150 and lines 152 and 154 to ports 156 and 158. Cylinder 102 connects to cylinder 146 through ports 160 and lines 162 and 164 to ports 166 and 168. Cylinder 140 connects through ports 170 and 172 to drain line 182 and pressure line 180 respectively. Cylinder 146 is connected by ports 174 and 176 to pressure line 180 and drain line 182 respectively. Ports 170, 172, 174 and 176 consist, in a preferred embodiment of short, narrow slots running lengthwise of the cylinders. This construction is necessary in order to restrict the leakage through pistons 140 and 146 to a minimum.

In floating cylinder 140 is provided a spool or piston 184 which is free to move back and forth within the cylinder between the limits of the mechanical stops provided therein. A floating spool or piston 186 of identical structure and having similar limitations of motion is provided in cylinder 146. Spools or pistons 184 and 186 are designed to occupy the position shown in FIG. 2 when the system is at rest. Under these conditions ports 170, 172, 176 and 174 are partially open. Opening port 174 further to pressure line 180 will serve to increase the pressure into lines 164 and 162, and, of course, to increase the pressure on the left end of piston 106. Closing port 174 will have the opposite effect of decreasing the pressure on the left end of piston 106. At 188 in cylinder 140 is shown an orifice which is designed to retard the flow of fluid into and out of the end of the cylinder adjacent to the spool or piston 184. Floating cylinder 146 has a similarly located retarding orifice 190 located between the orifice or port 166 and the spool 186. These orifices 188 and 190 limit the rate at which pistons 184 and 186 move, thus contributing to a time delay as explained more in detail hereinafter.

Pressure line 180 has further constricting orifices located as shown at points 202 and 204, and drain line 182 has restricting orifices 200 and 206 similarly situated. These orifices 200, 202, 204 and 206 are designed to decrease the leakage of oil through the floating spool and also to improve the linearity of the relationship between position as opposed to pressure at the spool. The pressure from line 180 into cylinders 140 and 146 tends to keep floating piston 184 located between ports 170 and 172 and floating piston 186 located between ports 174 and 176, the exact location of these floating pistons being a function of the pressure distribution in cylinders 140 and 146. The pressure applied into line 180 in one embodiment of the invention amounts to 2000 p.s.i. and is associated with a leakage of approximately one half gallon of oil per minute into the drain pipe 182 through cylinders 140 and 146. Pressure is provided by pump 238 into line 234 and lines 20 and 180. Drainage into pump 238 is through lines 236 and 237.

Mechanical stops for each of the pistons 104, 106, 184 and 186 are located within the respective cylinders as indicated at 208, 210, 212, 214, 216, 218, 220 and 224. A filter 226 may be applied as shown in pressure line 234 and at other points throughout the system.

The apparatus illustrated in FIG. 2 may be characterized as operating in three modes, two of which are normal and one of which represents failure on the part of the servo valve to operate properly. The operation may be analyzed with respect to what takes place in cylinder 50. The two conditions for normal operation with respect to either side of the piston 52 in the cylinder 50 are those of flow into the cylinder when the pressure therein is decreasing and flow out of the cylinder when the pressure therein is increasing, in other words, a pressure and flow response which corresponds to the normal behaviour of fluids following pressure changes in a pressurized system. The failure type of characteristic occurs when there is a flow of liquid into the chamber at the same time that the pressure in the cylinder is increasing or a flow out at the same time the pressure in the cylinder is decreasing. This device is so designed that it is able to recognize the difference between failure and normal operation and is also able to cut off the flow of oil to the main cylinder 50 whenever failure occurs. Spools 104 and 106 stop the flow of oil in lines 130 and 134 by closing port 120 or 124 when a failure occurs which would drive the piston 52 too hard.

Tabulating the operating conditions, the following rules may be formulated:

Flow into cylinder\
Pressure increasing } =failure.

Flow into cylinder\
Pressure decreasing } =normal.

Flow out of cylinder\
Pressure increasing } =normal.

Before describing the action when failure occurs, it would be helpful to explain the operation of spools 184 and 186. The description will be limited to the action of spool 186 in the interest of simplicity, since these spools are parts of a symmetrical system and operate in the same manner under the same circumstances. The action of spool 186 is generally similar to that found in pressure type hydraulic servo valves such as the Cadillac type TC2. It is a basic characteristic of a spool of this type that the pressure on the left hand side of the spool will follow the pressure at the right hand side of the spool. For example, if the pressure on the right hand side of spool 186 increases, the spool tends to move somewhat to the left and as it does so the spool slightly increases the opening through the port 174 into the pressure supply line 180 and slightly decreases the opening through the port 176 into the drain line 182, thereby increasing the pressure on the left hand side of the spool. Similar action would occur if the pressure on the left hand side of spool 184 were increased.

Spool 186 together with the restricting orifice 190 and the other elements located between lines 142 and 162 provide a time delay action. This is so, since the orifice 190 restricts the rate of flow of fluid causing the motion of cylinder 186 to be retarded. An example of this may be found in the situation in which the pressure increases through port 144, tending to push piston 186 to the left. Since the fluid used is nearly incompressible, the motion of 186 will be retarded due to the fact that the flow of fluid through orifice 190 and the other elements is limited. The difference in the amount of time it takes for the pressure on the left end of piston 106 to equal that on the right end of piston 106 while the elements in FIG. 2 are connected as shown between line 142 and line 162, and the time it would take for the pressure to be equalized without the elements between line 142 and line 162 may be called the time delay.

In order to follow through the action which occurs at the several spools during a failure, let us first assume that the main piston 52 has been at rest, and that a sudden failure occurs which causes the pressure through lines 24, and 134 and through cylinder 102 into the orifice 62 on the right hand side of the main piston 52 to suddenly increase. Oil will, of course, flow into the piston 52 in the direction of this increased pressure. As the sudden pressure increase occurs in line 24 there will be a sudden increase in pressure through line 118 on the right hand side of spool 106. This pressure will be immediately transmitted across the spool causing it to move to the left, and the pressure on the opposite side of the spool in the space around spring 110 will correspondingly rise. The pressure likewise will suddenly rise on the right hand side of spool 186 which will transmit the pressure through orifice 190 which is a primary cause of the time delay referred to in the preceding paragraph. This time delay serves to prevent the immediate opening of port 174 which would connect the pressure line 180 through cylinder 146 to lines 164 and 162 to cylinder 102. The time delay therefore serves to delay the transmission of pressure to the face of piston 106 from port 174 which would tend to cause port 124 to be closed. In the meantime the increased pressure on the right hand side of spool 106 causes this spool to continue to move to the left, and as it partially closes off the port 124 from servo valve 2, the pressure continues to rise on the right hand side of spool 106 but it starts to decrease in line 134 below and consequently at orifice 190.

A sort of trigger action occurs at this point and spool 106 moves rapidly to the left to fully close off lines 116 and 134 and spool 186 tends to move back, since the pressure becomes less on its right face. The motion of spool 106 to the left cuts off the flow of oil to the main cylinder and stops the failure. This action of the safety device could continue to hold the main piston 52 stationary until the failure was cleared and the pressure on the right hand side of spool 106 decreased by a sufficient amount to permit it to return to its normal position. Actually a small amount of leakage past spool 106 tends to allow the main cylinder to move to the left during a prolonged failure until it hits its stops, but it moves very slowly and causes no injury to personnel or damage to equipment.

The foregoing describes the manner in which the safety device works to stop a failure when the failure is a sudden rise in the pressure on the right hand side of piston 52. If the failure were of the opposite sense, that is, one in which the pressure rose rapidly on the left hand side of piston 52, then spools 104 and 184 would have operated in the same fashion as spools 106 and 186, in order to stop the failure.

The operation of this device may be further explained as follows: Whenever there is a rise in pressure in lines 24, 118 and 134 with flow directed toward cylinder 50 there will be a increase in pressure through 118 on the right face of piston 106 which will tend to force it to the left to cover port 124. At the same time there is a rise in pressure on the right face of piston 186 which tends to move it to the left to cover exhaust port 176 and open pressure port 174. The motion of piston 186 to the left is retarded, however, by the orifice 190 which tends to slow down the flow of fluid adjacent to the left face of piston 186 through the orifice and thereby prevents the piston from moving rapidly to the left. If the orifice 190 were eliminated the piston 186 would move much more rapidly and would uncover the port 174 which could then transmit the pressure from line 180 through line 164 to prevent piston 106 from moving further left and to keep port 134 open. The effect therefore of cylinder 146 and its elements under these conditions is to introduce a time delay which will permit piston 106 to move far enough to close off port 124 and stop a failure of the system before piston 186 can open port 174.

It can be shown that this safety device does not limit normal operation of the servo valve 2 and the piston 52. As was pointed out above, there are two conditions which characterize normal operation-flow into the cylinder 50 with decreasing pressure or flow out of the cylinder with increasing pressure. If oil is flowing into the right hand side of the cylinder 50 with decreasing pressure, then the pressure is decreasing at the same rate on the right hand side of spool 106. By the same delaying action at spool 186 and orifice 190 that caused the equipment to arrest the failure, the pressure on the left hand side of spool 106 remains slightly above that on the right hand side as the pressure decreases, thereby holding spool 106 open (i.e. keeping port 124 open) and permitting normal operation.

The one remaining condition is flow out of the cylinder with increasing pressure. Assuming that this out-flow is from the right hand side of cylinder 50 there will also be a slight tendency for spool 106 to partially close port 124. If, however, spool 106 partially closes port 124 it tends to decrease the pressure on the right hand side of spool 106 and also tends to permit the build up of pressure on the opposite end of spool 106 due to the increased time available for piston 186 to move and partially open port 174. The net effect is to keep port 124 open except for a tendency to close momentarily at times which produces an objectionable "catch" in the feel. This effect is discussed further in connection with FIGS. 3 and 4.

The system shown in FIG. 2 obviously accommodates trim changes with no difficulty, since it does not depend upon recognition of discrete positions but only of velocities. There remains only one additional consideration for use of a device such as this in a flight simulator. Certain inputs do occur to this control loading equipment which are in the form of externally derived position signals. The simulated bob-weight is perhaps the best example of these. As the forces exerted by the simulated bob-weight change, the neutral position of the main cylinder changes. These changes due to bob-weight, however, are of limited velocity. For those bob-weight inputs of the higher frequencies the amplitude is quite low and for those having a more substantial amplitude the frequency is low and hence the velocities imposed are reasonably small. The springs 108 and 110, shown connected to pools 104 and 105 help create a threshold below which the safety device does not operate and hence permits such a thing as bob weight forces to occur in the normal fashion. It should be noted that large bob weight forces which might occur, for example, when the stick is pulled back hard to pull out of a dive can only occur when these forces are exerted on the stick itself. Therefore, these forces, while they may be large, only occur with large displacements of the stick from its normal position and do not result in confusion of the safety device.

During normal operation of the control loading system with which the device is associated, a condition may arise wheren one of the two spools 104 or 106, which arrest a failure, may tend to close momentarily causing an objectionable "catch" in the feel of the control stick at that instant. This possibility exists whenever the stick is being displaced from its center position and fluid is flowing out of one half of the main cylinder 50 toward spool 104 or 106 and toward the servo valve, with a simultaneous rise in pressure in the connecting line as the control loading system resists the displacement. This rise in pressure acts on one end of spool 104 or 106, and inasmuch as the counteracting rise in pressure at the opposite end of the spool is time delayed one of these spools may tend to move to close corresponding port 120 or 124.

It is possible to overcome this tendency for spools 104 and 106 to close their respective ports in response to small rates of motion by increasing the stiffness of springs 108 and 110. This tends to decrease the rapidity of action of the device in arresting a failure, however, and is not satisfactory.

Figure 3:
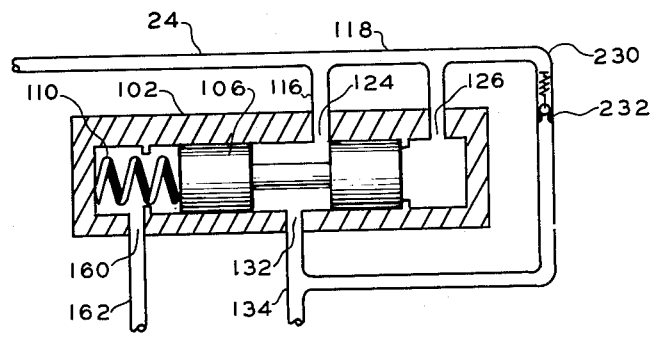
FIG. 3 is a partial section of a portion of FIG. 2 illustrating an additional embodiment.

Another means of overcoming the tendency of spools 104 and 106 to close partially at undesirable times is shown as check valve 232 in FIG. 3 in a hydraulic line 230 which may be connected between hydraulic lines in 114 and 130 on the one side of FIG. 2, and between lines 118 and 134 on the other side of FIG. 2. The check valve 232 is suitable to provide for the flow of fluid in one direction only. The purpose of this check valve is to allow the flow of fluid around cylinders 100 and 102 during the time when normal flow (i.e. flow under non-fail conditions) is being directed from line 130 into line 22 and from line 134 into line 24.

The arrangement employing a check valve offers the advantage that a given amount of fluid will flow at a particular pressure in a given direction regardless of whether the ports 120 and 124 are open or closed. This system eliminates the adverse effects on the "feel" of the stick resulting from undesired motion of the pistons when the flow is from the main cylinder toward the servo cylinder. When flow is from the servo toward the main cylinder this system naturally has little or no effect on the behaviour of the system, since the check valve is closed.

Figure 4:
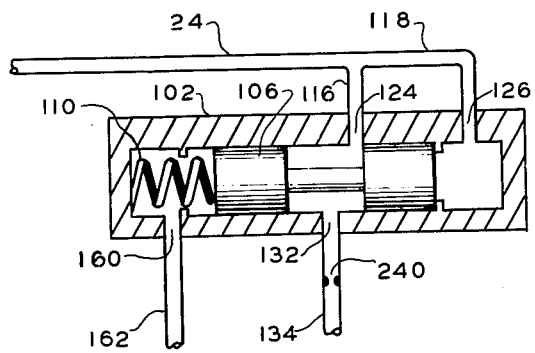
FIG. 4 is a partial section of a portion of FIG. 2 illustrating a further embodiment.

Another way to prevent this undesired motion is to add an orifice 240 as shown in FIG. 4 and also to add an orifice 240 in line 130 of FIG. 2. A little reflection will show that orifices installed in the lines connecting the servo valve 2 and the main cylinder 52 tend to retard closure of orifice 124 by spool 106 when the flow is away from the main cylinder 52 and to aid it when flow is toward the main cylinder. The addition of orifices 240 hence, is beneficial in the one case and detrimental in the other. The margin of safety in the latter case, however, is great enough that the effect of adding the orifices can be tolerated in order to secure the benefits which accrue in the former case. By careful balancing of the effect on spool 106 of the time delay provided by spool 186, the size of orifice 240, and the spring pressure on spool 106, it is possible in theory to equalize the margin of safety for both conditions and also to lower the failure threshold of operation, since the pressure change introduced when a failure occurs greatly increases the speed of response of the device.

The reason for this operation is that the orifices 240 introduce a reduction in pressure on their downstream sides. In the case of flow away from the main cylinder 52, the pressure tending to close port 124 through action on the right side of piston 106 is less initially than it would be without the orifice at 240, therefore, the port has less tendency to close. Another deterrent to closure of the port, under these circumstances, is that the pressure into cylinder 146 through port 144 has a tendency to move piston 186 which will then begin to open port 174 to put pressure on the extreme left face of piston 106 to keep it from closing port 124.

The operation of the device in the case of flow into the main cylinder with increasing pressure (failure) is attended by a similar decrease of pressure beyond the orifice, but in the direction of the main cylinder. In this case, the increase of pressure in cylinder 102 immediately causes the piston 106 to start closing port 124. Since the flow and pressure in line 134 beyond orifice 240 does not increase as rapidly as in cylinder 102, the pressure on piston 186 tending to move it to the left is less than it would otherwise be and this factor, taken together with the delay in opening port 174 caused by the slow action of piston 186 results in allowing piston 106 to close port 124 before port 174 can be opened to exert pressure through line 162 on the far end of piston 106. Under the circumstances, piston 106 will speedily close port 124 and shut down the system.

It will thus be seen that the objects set forth above, among those made apparent from the preceding invention, are efficiently attained. Since certain changes may be made in the constructions set forth without departing from the scope of the invention, it is intended that all matter contained in the above description or shown in the accompanying drawing shall be interpreted as illustrative and not in a limiting sense.

It is also to be understood that the following claims are intended to cover all of the generic, specific features of the invention herein described, and all statements of the scope of the invention which, as a matter of language, might be said to fall therebetween.

Having described my invention, what I claim as new and desire to secure by Letters Patent is set forth in the following claims:

1. A hydraulic system including; a servo valve for controlling the flow of operating fluid through conduit means to a hydraulic cylinder the piston of which is connected to manual actuating means, and a safety device in said conduit means comprising a first cylinder, a second cylinder, means connecting a port near a first end of said first cylinder and a port intermediate the ends of said first cylinder to a port near a first end of said second cylinder, means connecting a port in the second end of said first cylinder to a port intermediate the ends of said second cylinder and constricting means in said connecting means for delaying the transmission of pressure therein whereby violent excursions of said manual actuating means are prevented.

2. A hydraulic system including: a servo valve for controlling the flow of operating fluid through conduit means to a hydraulic cylinder the piston of which is connected to manual actuating means, and a safety device in said conduit means comprising a plurality of cylinders, means placed within said cylinders including spring biased pistons and floating pistons, means interconnecting said cylinders, said interconnecting means including pipe-like conduits and pressurizing means, said conduits having placed therein orifices for controlling the rate of flow of the fluid therein, said orifices introducing time delays between various elements in the device to alter the behaviour thereof and especially to cause the device to stop the flow of fluid on the occurrence of certain pressure relationships at the time that certain relationships of flow occur whereby violent excursions of said manual actuating means are prevented.

3. In a hydraulic control system for aircraft simulators, a safety device for preventing excessively violent motion between elements of said system comprising a hydraulic control device, a piston in said hydraulic control device coupled to manual controls and responsive to computing means to simulate the feel of an aircraft manual control, a hydraulic control valve, hydraulic coupling means connected between said hydraulic control device and said hydraulic control valve, hydraulic vave means connected to said hydraulic coupling means, said hydraulic valve means including a plurality of pistons free to move rectilinearly within a plurality of cylinders, said hydraulic valve means maintaining said coupling means open to controlled fluid flow, and said hydraulic valve means preventing fluid flow into said hydraulic control device after the first surge of uncontrolled fluid flow representing a failure in the system.

4. In a hydraulic control system for aircraft simulators, a safety device for preventing violent motion of the elements of said systems comprising a plurality of cylinders interconnected by hydraulic conduits, a first of said cylinders serving as an actuating cylinder and conveying the forces in said system through a piston and mechanical linkages to the simulated controls of the aircraft, a second of said cylinders serving as means to sense the rate of change of pressure in said conduits and being connected by a first hydraulic line to said first cylinder, a third one of said cylinders serving as a control means connecting to said first and second cylinders via said first hydraulic line and connecting to said second cylinder by a third hydraulic line, and additional hydraulic lines connecting said third cylinder to hydraulic pressure control means, whereby said third cylinder acting in cooperation with said second cylinder is enabled to stop the flow of hydraulic fluid into said actuating cylinder on the occurrence of abrupt changes in pressure.

5. In a hydraulic control system for aircraft simulators, a safety device for preventing violent motion of the elements of said system comprising a plurality of cylinders interconnected by hydraulic conduits, a first of said cylinders serving as an actuating cylinder and conveying the forces in said system through a piston and mechanical linkages to the simulated controls of the aircraft, a second of said cylinders serving as means to sense the rate of change of pressure in said conduits and being connected by a first hydraulic line to said first cylinder, a third one of said cylinders serving as a control means connecting to said first and second cylinders via said first hydraulic line and connecting to said second cylinder by a third hydraulic line, and additional hydraulic lines connecting said third cylinder to hydraulic pressure control means, whereby said third cylinder acting in cooperation with said second cylinder is enabled to stop the flow of hydraulic fluid in said system in response to abrupt changes in pressure.

6. In an aircraft simulator, a hydraulic control system including a cylinder and piston functioning as an actuator and a control valve, a safety device comprising means for preventing excessively violent motion of said actuator, motive means in said actuator coupled to hand controls and responsive to computing means acting through said control valve to simulate the feel of an aircraft hand control, hydraulic means coupled between said actuator and a first cylinder and a second cylinder, second motive means floating in said first cylinder with one end constrained by a first biasing means, third motive means floating in said second cylinder with one end constrained by a second biasing means, additional hydraulic means coupling said first cylinder to said second cylinder, said additional hydraulic means serving along with the second and third motive means in said first and second pistons to sense any abrupt increase in the rate of flow of fluid into said actuator accompanied by increasing pressure and to activate said third piston to slow down and stop the flow of fluid into said actuator.

7. A hydraulic system including: a servo valve for controlling the flow of operating fluid through conduit means to a hydraulic cylinder the piston of which is connected to manual actuating means, and a safety device comprising means for detecting the increase of pressure in said cylinder accompanied by the inflow of said fluid to said cylinder and for blocking said conduit means in response thereto, thereby preventing violent excursions of said manual actuating means.

8. A hydraulic system including: a servo valve for controlling the flow of operating fluid through conduit means to a hydraulic cylinder the piston of which is connected to manual actuating means, and a safety device comprising means for detecting the increase of the pressure of said fluid in said conduit means adjacent said servo valve with respect to the pressure of said fluid in said conduit means adjacent said hydraulic cylinder, and for blocking said conduit means in response thereto, thereby preventing violent excursions of said manual actuating means.

9. A hydraulic system including: a servo valve for controlling the flow of operating fluid through conduit means to a hydraulic cylinder the piston of which is connected to manual actuating means, and a safety device comprising blocking means for blocking said conduit means in response to a rise in pressure therein, and delaying means for delaying the operation of said blocking means, said blocking means and said delaying means being so constructed and arranged as to inhibit the operation of said delaying means when said rise in pressure originates at said servo valve, whereby violent excursions of said manual actuating means are prevented.

10. A hydraulic system including: a servo valve for controlling the flow of operating fluid through conduit means to a hydraulic cylinder the piston of which is connected to manual actuating means, and a safety device comprising blocking means for blocking said conduit means in response to a rise in pressure therein, delaying means for delaying the operation of said blocking means, and by-pass conduit means connected to by-pass said blocking means and including check valve means, said blocking means and said delaying means being so constructed and arranged as to inhibit the operation of said delaying means when said rise in pressure originates at said servo valve, whereby violent excursions of said manual actuating means are prevented.

11. A hydraulic system including: a servo valve for controlling the flow of operating fluid through conduit means to a hydraulic cylinder the piston of which is connected to manual actuating means, and a safety device comprising blocking means for blocking said conduit means in response to a rise in pressure therein, delaying means for delaying the operation of said blocking means, and by-pass conduit means connected to by-pass said blocking means and including check valve means to permit the flow of said fluid around said blocking means toward said servo valve, but not toward said hydraulic cylinder means, said blocking means and said delaying means being so constructed and arranged as to inhibit the operation of said delaying means when said rise in pressure originates at said servo valve, whereby violent excursions of said manual actuating means are prevented.

12. A hydraulic system including: a servo valve for controlling the flow of operating fluid through conduit means to a hydraulic cylinder the piston of which is connected to manual actuating means, and a safety device comprising blocking means for blocking said conduit means in response to a rise in pressure therein, delaying means for delaying the operation of said blocking means, and constriction means in said conduit means between said delaying means and said blocking means, said blocking means and said delaying means being so constructed and arranged as to inhibit the operation of said delaying means when said rise in pressure originates at said servo valve, whereby violent excursions of said manual actuating means are prevented.

13. Safety device means for use in a hydraulic system including a servo valve, a hydraulic cylinder, and external actuator means for said hydraulic cylinder, comprising: first shut off means in a first supply line from said valve to said cylinder, said first shut off means including means for comparing the pressure in said first supply line with a first reference pressure and blocking said first supply line in response to a substantial unbalance therebetween; second shut off means in a second supply line from said valve to said cylinder, said second sut off means including means for comparing the pressure in said second supply line with a second reference pressure and blocking said second supply line in response to a substantial unbalance therebetween; means for supplying said first reference pressure to said first shut off means; and means for supplying said second reference pressure to said second shut off means; whereby said actuator is prevented by the blocking of one of said supply lines from making high-acceleration excursions.

14. Safety device means for use in a hydraulic system including a servo valve, a hydraulic cylinder, and external actuator means for said hydraulic cylinder, comprising: first shut off means in a first supply line from said valve to said cylinder, said first shut off means including means for comparing the pressure in said first supply line with a first reference pressure and blocking said first supply line in response to a substantial unbalance therebetween; second shut off means in a second supply line from said valve to said cylinder, said second shut off means including means for comparing the pressure in said second supply line with a second reference pressure and blocking said supply line in response to a substantial unbalance therebetween; means for supplying said first reference pressure to said first shut off means; means for supplying said second reference pressure to said second shut off means; means for delaying the supply of said first reference pressure; and means for delaying the supply of said second reference pressure; whereby said actuator is prevented by the blocking of one of said supply lines from making high-acceleration excursions.

15. Safety device means for use in a hydraulic system including a servo valve, a hydraulic cylinder, and external actuator means for said hydraulic cylinder, comprising: first shut off means in a first supply line from said valve to said cylinder, said first shut off means including means for comparing the pressure in said first supply line with a first reference pressure and blocking said first supply line in response to a substantial unbalance therebetween; second shut off means in a second supply line from said valve to said cylinder, said second shut off means including means for comparing the pressure in said second supply line with a second reference pressure and blocking said second supply line in response to a substantial unbalance therebetween; means for supplying said first reference pressure to said first shut off means; means for supplying said second reference pressure to said second shut off means; first means for delaying the supply of said first reference pressure; second means for delaying the supply of said second reference pressure; means for inhibiting the operation of said first means; and means for inhibiting the operation of said second means; whereby said actuator is prevented by the blocking of one of said supply lines from making high-acceleration excursions.

References Cited in the file of this patent

UNITED STATES PATENTS 2,745,499  Berninger et al. _____ May 15, 1956